Nov. 10, 1953 — H. R. FORNEY — 2,658,769
TELESCOPING TRAILER HITCH
Filed Jan. 5, 1951 — 2 Sheets-Sheet 1

Inventor
H. R. FORNEY
By Arthur H. Sturges
Attorney

Nov. 10, 1953  H. R. FORNEY  2,658,769
TELESCOPING TRAILER HITCH
Filed Jan. 5, 1951  2 Sheets-Sheet 2

H. R. Forney  Inventor
By Arthur H. Sturges  Attorney

Patented Nov. 10, 1953

2,658,769

UNITED STATES PATENT OFFICE 2,658,769

TELESCOPING TRAILER HITCH

Harold R. Forney, Surprise, Nebr.

Application January 5, 1951, Serial No. 204,581

2 Claims. (Cl. 280—33.14)

This invention relates to temporary connections between trailers, wagons, implements and the like and tractors, trucks and other towing devices, and in particular a telescoping hitch with means for readily connecting the parts and also means for adjusting the length thereof.

The purpose of this invention is to provide means in a tubular telescoping hitch for retaining the parts in alignment so that connecting pins are readily inserted through openings in the tubes, and also so that the pins may be inserted through openings at different points when it is desired to adjust the length of the hitch.

The size of commercial pipe and tubing is determined by the inside diameter thereof and the outside diameter is not sufficiently accurate to permit telescoping of one tube within another without such clearance that the pipes rattle in use. The conventional hitch is subjected to all kinds of weather and for this reason machined tubing, which readily corrodes, is not practical for this use. Furthermore for some uses, such as dumping corn into wagons, trucks and the like, it is desired to lengthen the hitch so that the corn may be deposited in both ends of the vehicle.

With these thoughts in mind this invention contemplates improvements in hitches of this type wherein projections are punched into an outer tube to compensate for the difference between the outside diameter of the inner tube and inside diameter of the outer tube or pipe, and means is provided for holding the tubes in alignment whereby spaced pairs of openings through the tubes, which provide adjustment in the length of the hitch, may be retained in alignment.

The object of this invention is, therefore, to provide means for constructing a hitch of the telescoping draft or trailer type wherein conventional pipe may be used for the telescoping elements.

Another object of the invention is to provide a hitch of the telescoping draft or trailer type in which the length is adjustable.

A further object of the invention is to provide an extensible hitch for connecting a tractor or other towing vehicle to a wagon, truck, implement or the like, in which the hitch is sufficiently rugged to prevent the vehicle being towed to creep up or roll against the towing vehicle.

A still further object of the invention is to provide a tubular telescoping hitch formed of conventional pipe with means therein for eliminating play between the parts, and also means for adjusting the length thereof, in which the hitch is of a simple and economical construction.

With these and other objects and advantages in view the invention embodies an outer pipe having means on one end thereof for mounting the hitch on a trailer or the like, an inner pipe slidably mounted in the outer pipe and having bars extended from the outer end thereof, a key on the inner surface of the outer pipe and extended into a slot in the inner pipe, and a pin slidably mounted in openings in the outer pipe and positioned in a yoke on the outer surface of the said outer pipe and resiliently held in locking engagement with the inner pipe by a spring positioned in the said yoke.

Other features and advantages of the invention will appear from the following description taken in connection with the drawings, wherein.

Figure 1:
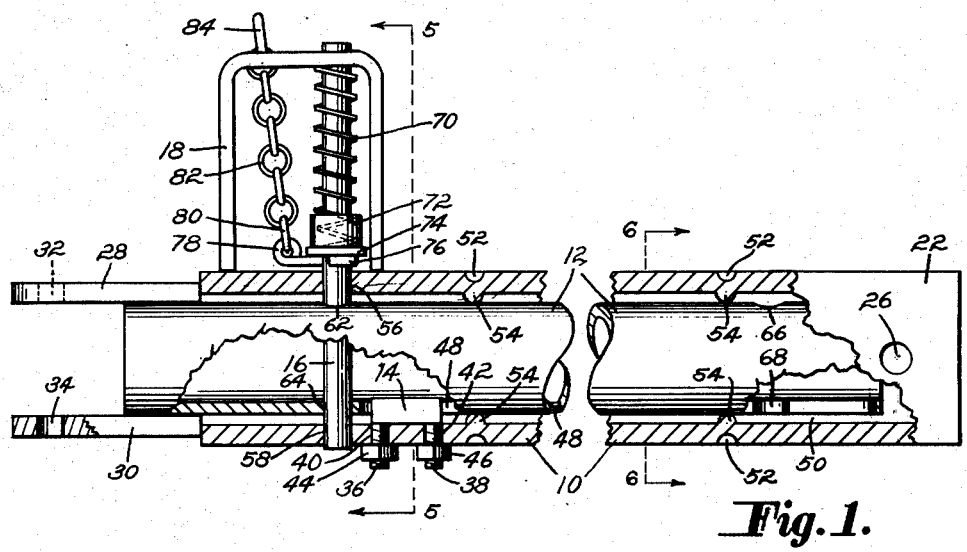
Figure 1 is a longitudinal section through the outer pipe of the hitch with the inner pipe shown in the inner position therein and with parts of the inner pipe broken away and shown in section.
Figure 2:
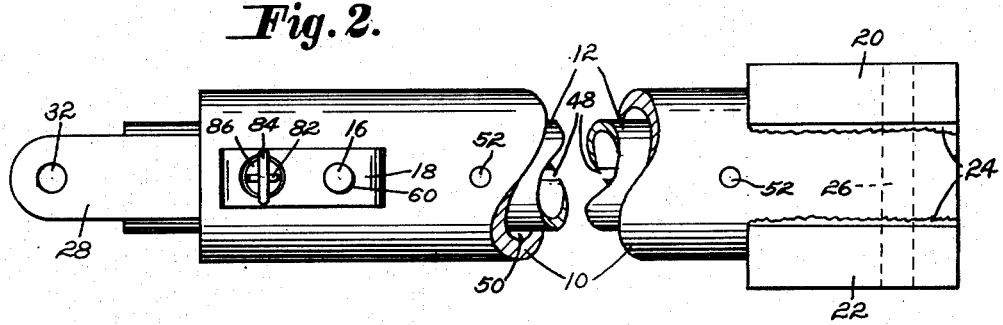
Figure 2 is a plan view of the hitch with the parts assembled and with parts broken away.
Figure 3:
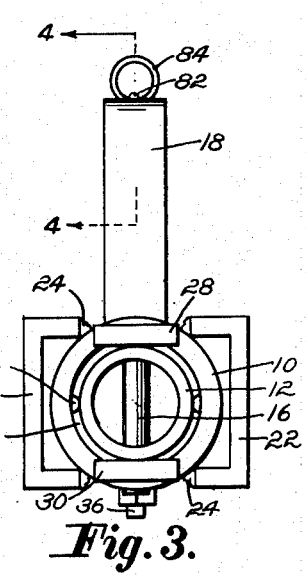
Figure 3 is an end elevational view of the hitch looking toward the end thereof from which the inner tube extends.

Referring now to the drawings wherein like reference characters denote corresponding parts the improved tractor and trailer or draft hitch of this invention includes an outer pipe 10, an inner pipe 12, a key 14, a locking pin 16, and a yoke 18 for holding the outer end of the pin.

One end of the outer pipe 10 is provided with channel irons 20 and 22 which are secured to the pipe, preferably by welding as indicated at the points 24, and the outer parallel surfaces of the channel irons are positioned for insertion between the walls of the notch provided in the steering gear of a wagon or the like, for the conventional tongue of the wagon. An opening 26 which extends through the webs of the channel irons and pipe is positioned to receive a pin or bolt of the notch or socket and by which the tongue is usually held in the steering gear.

The outer end of the inner pipe is provided with bars 28 and 30 which are positioned in planes perpendicular to the webs of the channel irons on the opposite end of the outer pipe, and these bars, which are secured, also by welding, to the outer surface of the inner pipe are provided with aligned vertically positioned openings 32 and 34 that are positioned to receive a pin of a draw bar or clevis extended from the rear of a tractor or other towing vehicle.

The openings of the bars 28 and 30 of the inner pipe are vertically positioned whereby the hitch is free to swing in a horizontal plane, and the opening 26 is horizontally disposed so that the hitch may swing in a vertical plane.

The key 14 is positioned on the inner surface and in the lower side of the outer pipe 10 and threaded studs 36 and 38 which extend from the key, are positioned in openings 40 and 42 in the wall of the outer pipe. The studs are provided with lock nuts 44 and 46 which hold the key in position whereby the key extends into a slot 48 in the lower side of the inner pipe 12.

As the outer surface of conventional pipe is not finished and also as pipe of this type is not made to telescope, an annular area 50 exists between the outer surface of the inner pipe and inner surface of the outer pipe, and in order to prevent the inner pipe rattling in the outer pipe indentations 52 are punched into the outer surface of the outer pipe and these cause nodes or projections 54 on the inner surface of the outer pipe. With these projections skilfully formed the inner pipe is equally spaced from the outer pipe so that one pipe is concentric with the other.

Figure 4:
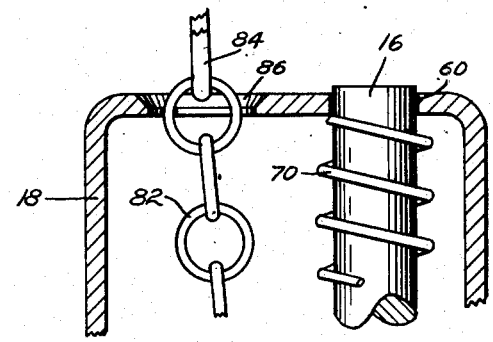
Figure 4 is a detail showing a section taken on line 4—4 of Figure 3 illustrating the chain and pin receiving openings in the upper end of the yoke.
Figure 6:
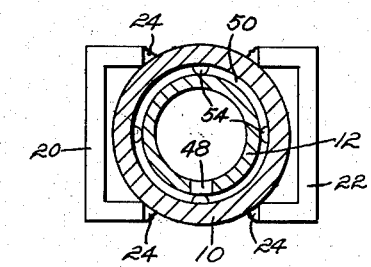
Figure 6 is a similar section taken on line 6—6 of Figure 1.
Figure 5:
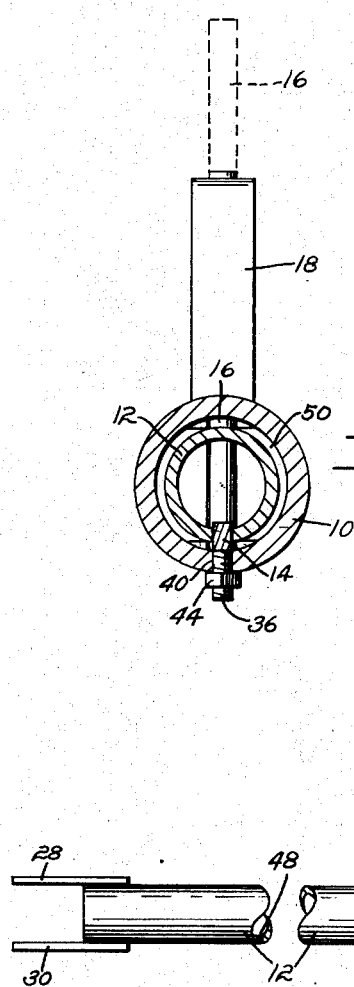
Figure 5 is a cross section through the hitch, taken on line 5—5 of Figure 1.
Figure 7:
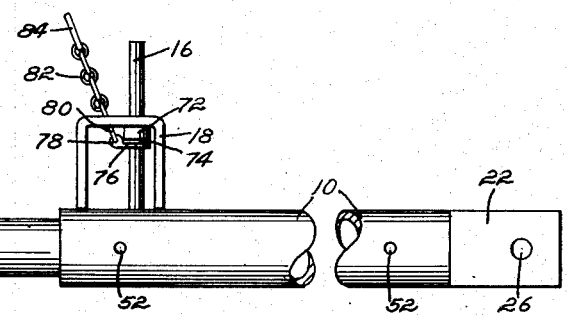
Figure 7 is a side elevational view of the hitch with the parts shown on a small scale and with parts broken away.

The pin 16 is slidably mounted in openings 56 and 58 in the wall of the outer pipe 10 and the outer end is slidably held in an opening 60 in the outer end of the yoke 18, as shown in Figures 1 and 4. The inner pipe is provided with a pair of openings 62 and 64 which are spaced from the outer end, and another pair of openings 66 and 68, that are spaced from the opposite end, and both of these pairs of openings are positioned to register with the openings 56 and 58 of the outer pipe, and with the pipes held in alignment by the key 14 in the slot 48 the pin 16 will extend through the pair of openings in the outer end of the inner pipe with the pipes in the positions shown in Figure 1. In the same manner the pin 16 will extend through the openings 66 and 68 in the opposite end of the inner pipe when the inner pipe is drawn outwardly, as illustrated in Figure 7.

A spring 70 is provided around the pin 16 for resiliently urging the pin inwardly in locking engagement with the inner pipe. The outer end of the spring is positioned against the inner surface of the outer end of the yoke 18 and the inner end is held in a cup-shape washer 72 that is positioned on a flat washer 74, and the flat washer 74 is held in position by a pin 76 which extends through the pin 16. The length of the washer 72 is such that when the outer end thereof engages the outer end of the yoke the inner end of the pin 16 is in the opening 56. By this means it is impossible for the pin 16 to work out of the outer pipe.

The outer end of the pin 76 is provided with an eye 78 in which a ring 80 of a chain 82 is positioned and the outer end of the chain is provided with a ring 84 that holds the upper end of the chain in an opening 86 in the upper end of the yoke 18. A rope, cable, or the like, which may be attached to the ring 84, may extend to the driver's seat of a towing vehicle or to any suitable point.

With the parts arranged in this manner one end of the hitch may be attached to a wagon, trailer, or the like and the other to a tractor, truck, or other towing vehicle, and when it is desired to release the vehicle being towed it is only necessary to pull upwardly on the chain 82 so that the pin 16 will be drawn from the inner pipe, and the inner pipe will be released.

When it is desired to increase the length of the hitch the pin 16 is placed through the pair of openings 66 and 68 of the inner pipe, and the parts will assume the positions as shown in Figure 7.

From the foregoing description it is thought to be obvious that a telescoping draft hitch constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice, except as claimed.

Having thus fully described the invention what I claim as new and desire to secure by Letters Patent, is:

1. A trailer hitch comprising an outer pipe having a transversely disposed coupling bolt receiving opening extended therethrough and spaced inwardly from one end, an inner pipe extended into the end of the outer pipe opposite to the end in which said coupling bolt receiving opening is positioned and having horizontally disposed bars with vertically positioned pin receiving openings therein on the extended end thereof and said openings being spaced inwardly from the ends of the bars, a yoke mounted on the outer pipe, extended upwardly therefrom, and positioned adjacent to the end thereof into which the inner pipe extends, said outer pipe having aligned coupling pin receiving openings in the wall thereof and said inner pipe having spaced aligned openings positioned, selectively, to register with said coupling pin receiving openings of the outer pipe, a coupling pin slidably mounted in said coupling pin receiving openings of the outer pipe and extended through said yoke, resilient means for urging said coupling pin through the coupling pin receiving openings of the outer pipe and into the spaced openings of the inner pipe, and means preventing rotation of the inner pipe in the outer pipe whereby said openings remain in registering relation, and said outer pipe having spaced radially disposed projections on the inner surface for retaining the inner pipe substantially centered in the outer pipe.

2. A trailer hitch comprising an outer pipe having a transversely disposed coupling bolt receiving opening extended therethrough and spaced inwardly from one end, an inner pipe extended into the end of the outer pipe opposite to the end in which said coupling bolt receiving opening is positioned and having horizontally disposed bars with vertically positioned pin receiving openings therein on the extended end and said openings being spaced inwardly from the ends of the bars, a U-shaped yoke mounted on the outer pipe, extended upwardly therefrom, and positioned adjacent to the end thereof into which the inner pipe extends, said outer pipe having aligned coupling pin receiving openings in the wall thereof and said inner pipe having spaced openings positioned, selectively, to register with said coupling pin receiving openings of the outer pipe, said yoke being positioned over said coupling pin receiving openings and having an opening aligned with said openings of the outer pipe, a coupling pin having a collar thereon slidably mounted in the coupling pin receiving openings of the outer pipe and opening of the yoke, a spring on said coupling pin and positioned between the collar and yoke for urging the pin through the openings of the pipes, said yoke also having a slot therein, a chain extended from the collar of the coupling pin through the slot of the yoke for retaining the coupling pin withdrawn from the inner pipe, said inner pipe having an elongated longitudinally positioned slot therein, and a key on the inner surface of the outer pipe and positioned to extend into the slot of the inner pipe to prevent rotation of the inner pipe in relation to the outer pipe, and said outer pipe having spaced radially disposed projections on the inner surface for retaining the inner pipe in spaced relation to the outer pipe.

HAROLD R. FORNEY.

References Cited in the file of this patent

UNITED STATES PATENTS

| Number | Name | Date |
|---|---|---|
| 2,259,433 | Kitto | Oct. 14, 1941 |
| 2,286,422 | Katcher | June 16, 1942 |
| 2,415,478 | Forney | Feb. 11, 1947 |
| 2,446,223 | Forney | Aug. 3, 1948 |
| 2,447,737 | Christensen | Aug. 24, 1948 |
| 2,497,234 | Mylie | Feb. 14, 1950 |
| 2,518,816 | Powers | Aug. 15, 1950 |

FOREIGN PATENTS

| Number | Country | Date |
|---|---|---|
| 462,059 | Canada | Dec. 27, 1948 |